(12) United States Patent
Kovacs et al.

(10) Patent No.: US 11,885,377 B2
(45) Date of Patent: Jan. 30, 2024

(54) SNAP RING MOUNTED CONDUCTIVE ASSEMBLY FOR BEARINGS

(71) Applicant: AKTIEBOLAGET SKF, Gothenburg (SE)

(72) Inventors: Gene A Kovacs, Brighton, MI (US); John Castellano, Troy, MI (US); Mathieu Hubert, Ann Arbor, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/842,004

(22) Filed: Jun. 16, 2022

(65) Prior Publication Data

US 2023/0383793 A1 Nov. 30, 2023

Related U.S. Application Data

(60) Provisional application No. 63/346,968, filed on May 30, 2022.

(51) Int. Cl.
*F16C 41/00* (2006.01)
*F16C 33/58* (2006.01)
*F16C 19/16* (2006.01)

(52) U.S. Cl.
CPC .......... *F16C 41/002* (2013.01); *F16C 19/16* (2013.01); *F16C 33/583* (2013.01)

(58) Field of Classification Search
CPC ........ F16C 19/16; F16C 19/52; F16C 33/583; F16C 41/002; H01R 39/24; H01R 39/29; H01R 39/385; H01R 39/39; H01R 39/64; H01R 39/643; H02K 5/145
See application file for complete search history.

(56) References Cited

U.S. PATENT DOCUMENTS

| | | | |
|---|---|---|---|
| 3,757,164 A | 9/1973 | Binkowski | |
| 5,812,908 A | 9/1998 | Larocca et al. | |
| 8,169,766 B2 | 5/2012 | Oh et al. | |
| 9,464,672 B2 | 10/2016 | White | |
| 10,253,818 B1 | 4/2019 | Ince et al. | |
| 11,309,775 B2 | 4/2022 | Hubert et al. | |
| 2019/0296617 A1* | 9/2019 | Hubert | H01R 39/64 |
| 2020/0263734 A1* | 8/2020 | Kottapalli | F16C 33/4605 |
| 2021/0293279 A1 | 9/2021 | Hubert et al. | |

(Continued)

*Primary Examiner* — Alan B Waits

(74) *Attorney, Agent, or Firm* — J-TEK LAW PLLC; Scott T. Wakeman; Mark A. Ussai

(57) ABSTRACT

An electrically conductive assembly for preventing current flow through the raceways of a bearing includes a mounting ring disposeable within a retention groove of an outer member or a bearing outer ring and is formed of an electrically conductive elastic material. The mounting ring has two circumferential ends spaced apart and is deflectable inwardly such that the two circumferential ends displace generally toward each other to reduce the outside diameter of the ring for installation into the retention groove. An arcuate conductor has an outer radial end attached to the mounting ring, an inner radial end engageable with the shaft or the bearing inner ring and two circumferential ends spaced apart to define an arcuate gap when the conductor is installed about a shaft or a bearing inner ring. An electrically conductive path extends between the shaft and the outer member through the arcuate conductor and the mounting ring.

20 Claims, 7 Drawing Sheets

(56) References Cited

U.S. PATENT DOCUMENTS

2021/0310518 A1 10/2021 Berruet et al.
2021/0310520 A1 10/2021 Arnault et al.
2021/0364040 A1 11/2021 Arnault et al.
2021/0364041 A1 11/2021 Berruet et al.

* cited by examiner

SNAP RING MOUNTED CONDUCTIVE ASSEMBLY FOR BEARINGS

CROSS-REFERENCE

This application claims priority to U.S. Provisional Patent Application No. 63/346,968 filed on May 30, 2022, the entire contents of which are fully incorporated herein by reference.

BACKGROUND OF THE INVENTION

The present invention relates to bearings, and more particularly to grounding devices for preventing electric current or charge from passing through a bearing.

Bearings used in electrical machinery, such as motors, generators and similar devices, may be damaged if electric current or charge passes through the bearing, which is particularly harmful to the bearing raceways. Devices such as grounding brushes have been developed to provide an alternative path for current and thereby prevent such current from passing through the bearing. These devices often include a plurality of conductive fibers spaced circumferentially about the entire outer surface of the shaft to form a relatively solid ring of fibers, such that current passes through the fibers between the shaft and the housing. Other devices or mechanisms are provided to electrically insulate the bearing in order to prevent current from passing through the bearing and may include insulative coatings or coverings.

SUMMARY OF THE INVENTION

In one aspect, the present invention is an electrically conductive assembly for preventing current flow through the raceways of a bearing having an inner ring disposed about a shaft and an outer ring disposed within a bore of an outer member, the shaft or the outer member being rotatable about a central axis through the shaft, an annular retention groove being formed in an inner circumferential surface of the outer member or of the bearing outer ring. The conductive assembly comprises a mounting ring disposeable within the retention groove and formed of an electrically conductive elastic material, the mounting ring having an outside diameter and two circumferential ends spaced circumferentially apart and being deflectable generally radially inwardly. As such, each one of the two circumferential ends displaces generally toward the other one of the two circumferential ends to reduce the outside diameter of the ring for installation into the retention groove. An arcuate conductor has a centerline, an outer radial end attached to the mounting ring and an inner radial end engageable with the shaft or the bearing inner ring such that an electrically conductive path extends between the shaft and the outer member through the arcuate conductor and the mounting ring.

In another aspect, the present invention is an electrically conductive assembly as described in the preceding paragraph and further in which the arcuate conductor includes an arcuate conductive retainer, the retainer having an outer radial end, an inner radial end and an annular channel extending radially outwardly from the inner radial end. A plurality of conductive fibers are spaced circumferentially about the conductor centerline, each fiber having an outer radial end disposed within the channel of the retainer and at least one inner radial end engageable with the shaft or the bearing inner ring.

In a further aspect, the present invention is an electrically conductive assembly as described above and in which the arcuate conductor has two circumferential ends spaced circumferentially apart such that an arcuate gap is defined between the two circumferential ends of the conductor when the conductor is installed about the shaft or the inner ring.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
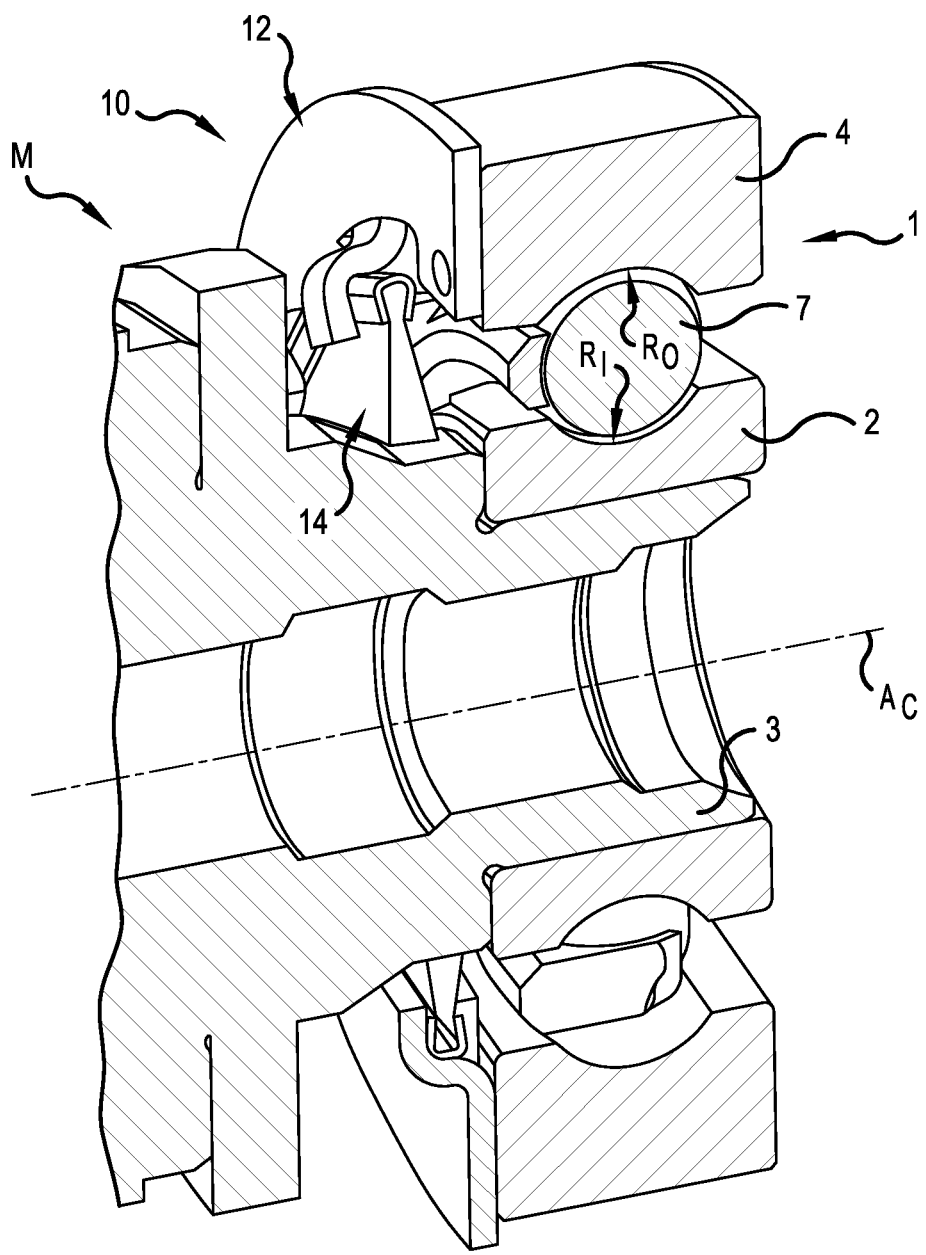
FIG. 1 is axial cross-sectional view in perspective of a mechanical assembly including a conductive assembly in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-10 an electrically conductive assembly 10 for preventing current flow through the inner and outer raceways $R_I$, $R_O$, respectively, of a bearing 1. The bearing 1 has an inner ring 2 disposed about a shaft 3, an outer ring 4 disposed within a bore 5 of an outer member 6, such as a housing, an axle, etc., and a plurality of rolling elements 7. The rolling elements 7 each roll simultaneously upon the raceways $R_I$, $R_O$ to rotatably couple the bearing rings 2, 4. The shaft 3 or the outer member 6 is rotatable about a central axis $A_C$ through the shaft 3, and the bearing 1, and the shaft 3 and the outer member 6 (FIG. 3) are all components of a motor or other electrical machine M (e.g., a generator) or any other machine having rotatable components likely to accumulate electric charge or convey electric current.

Figure 2:
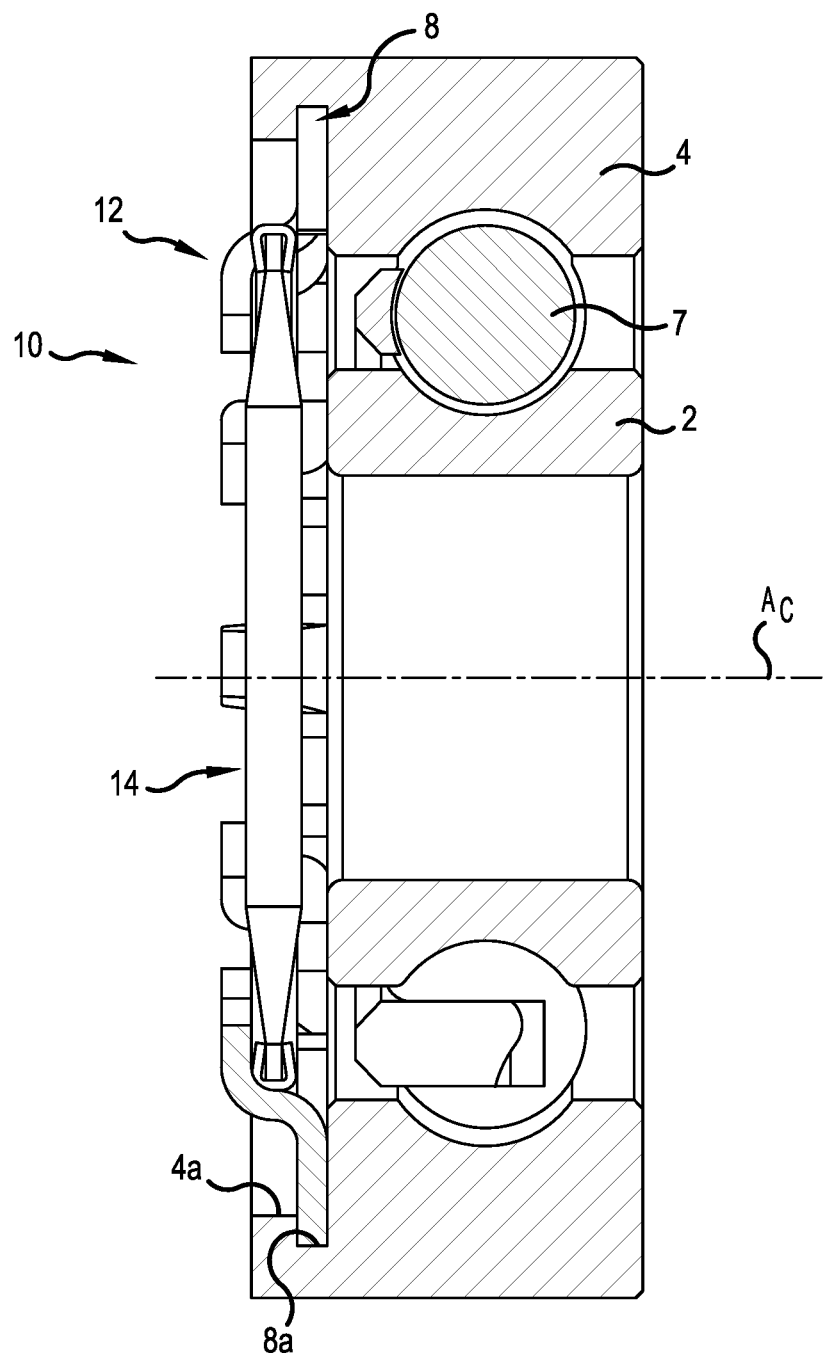
FIG. 2 is an axial cross-sectional view of the conductive assembly shown mounted in a bearing outer ring.
Figure 3:
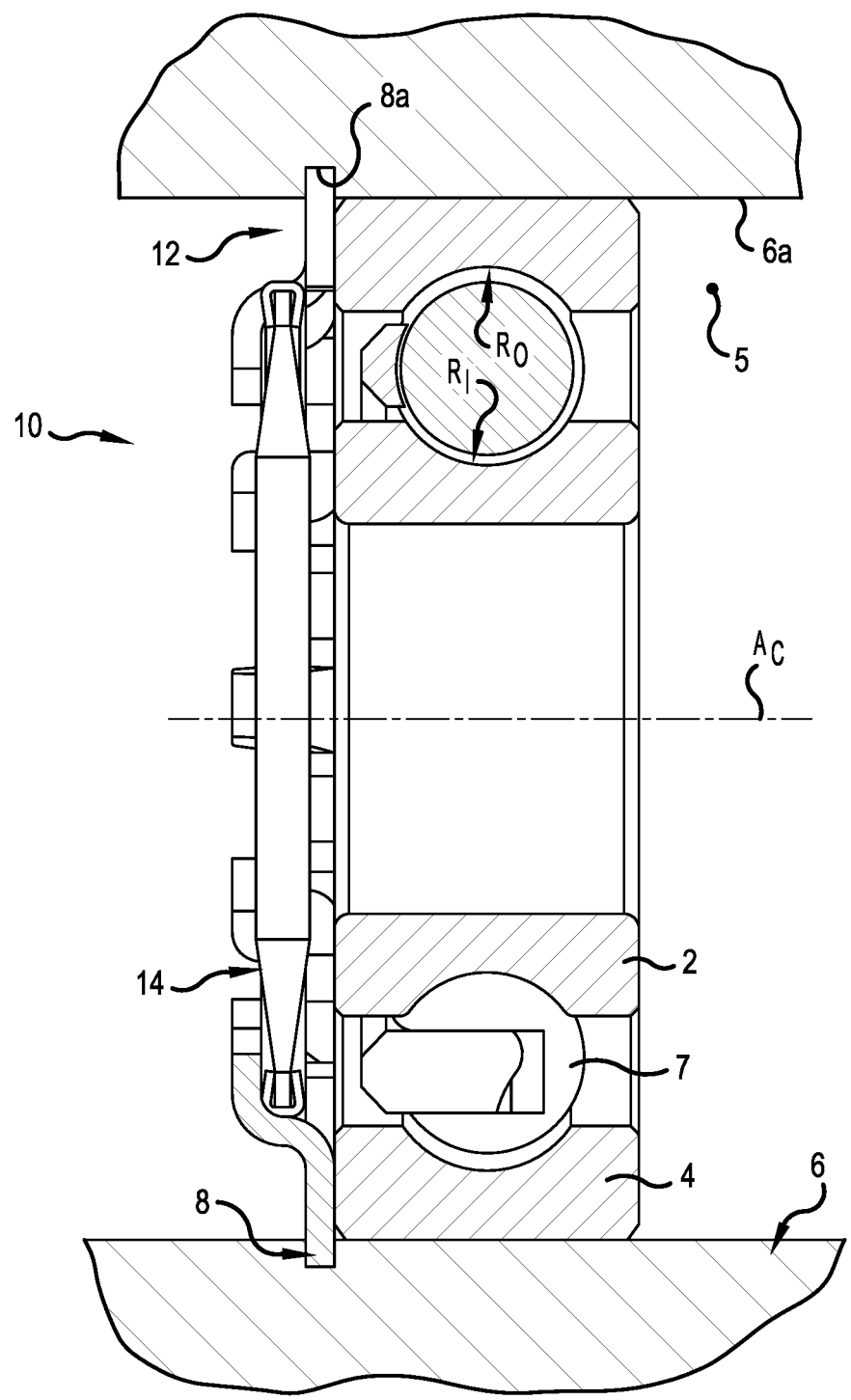
FIG. 3 is an axial cross-sectional view of the conductive assembly shown mounted in an outer member.
Figure 4:
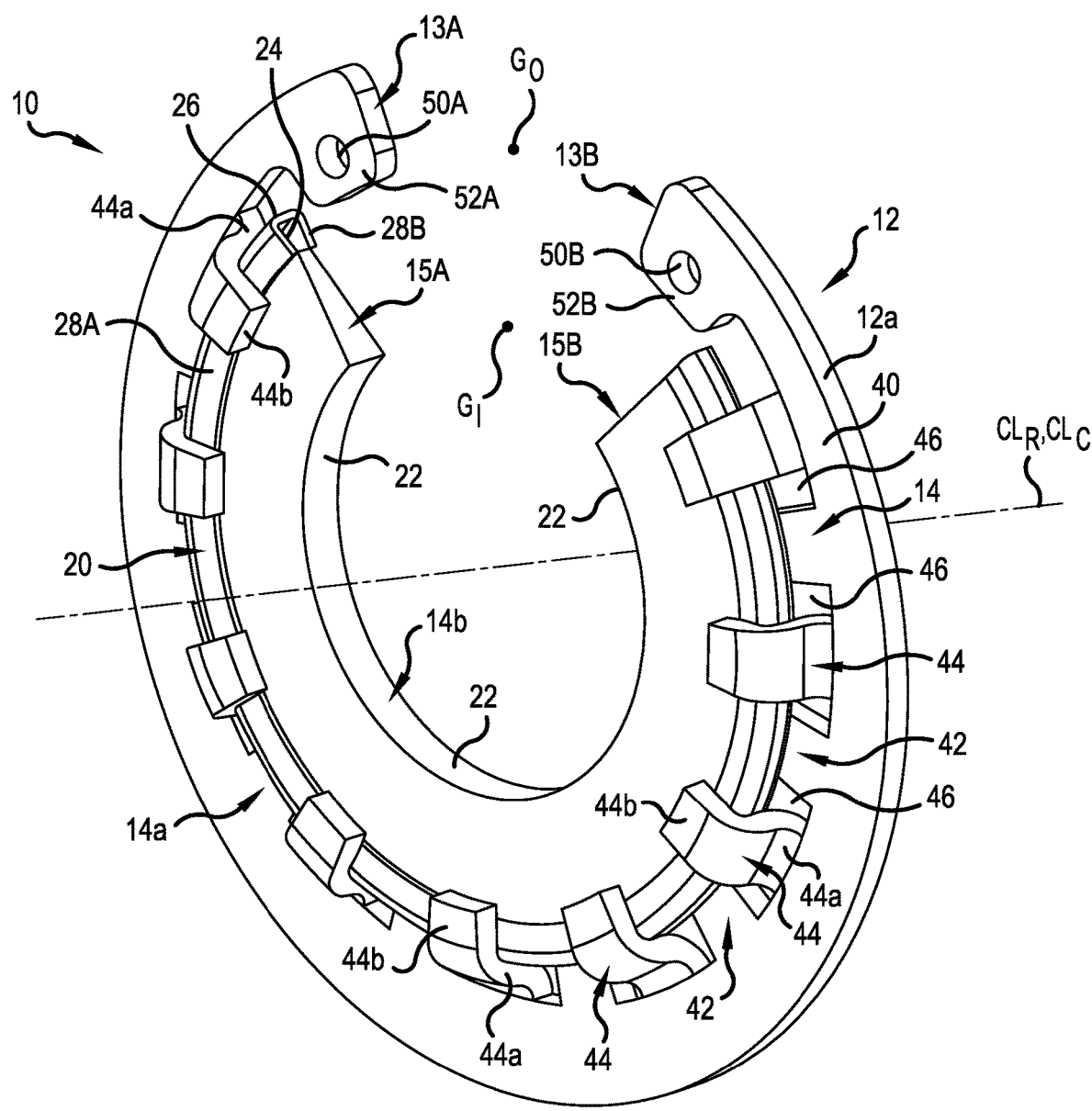
FIG. 4 is a perspective view of the conductive assembly.
Figure 5:
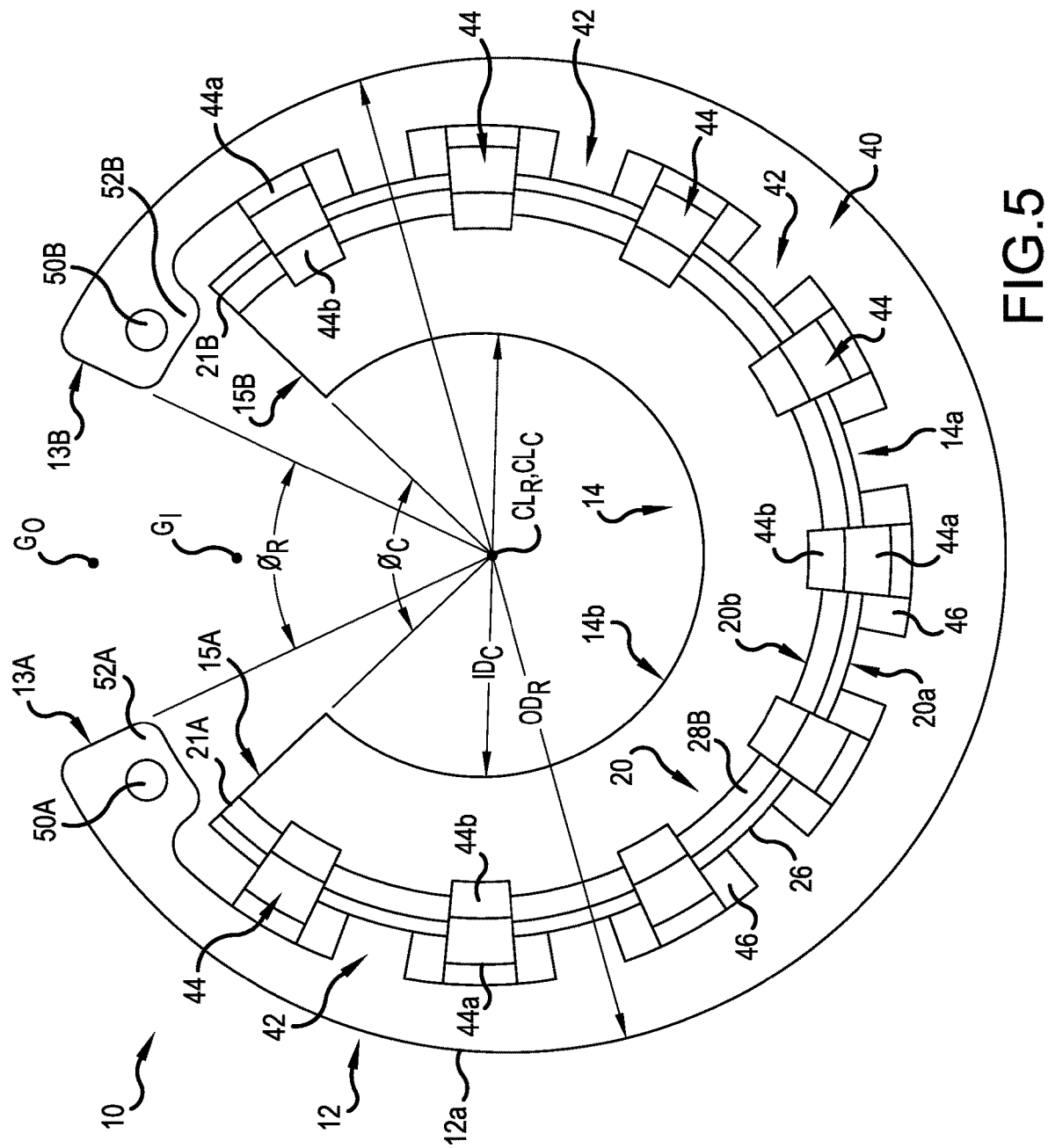
FIG. 5 is a front plan view of the conductive assembly.
Figure 6:
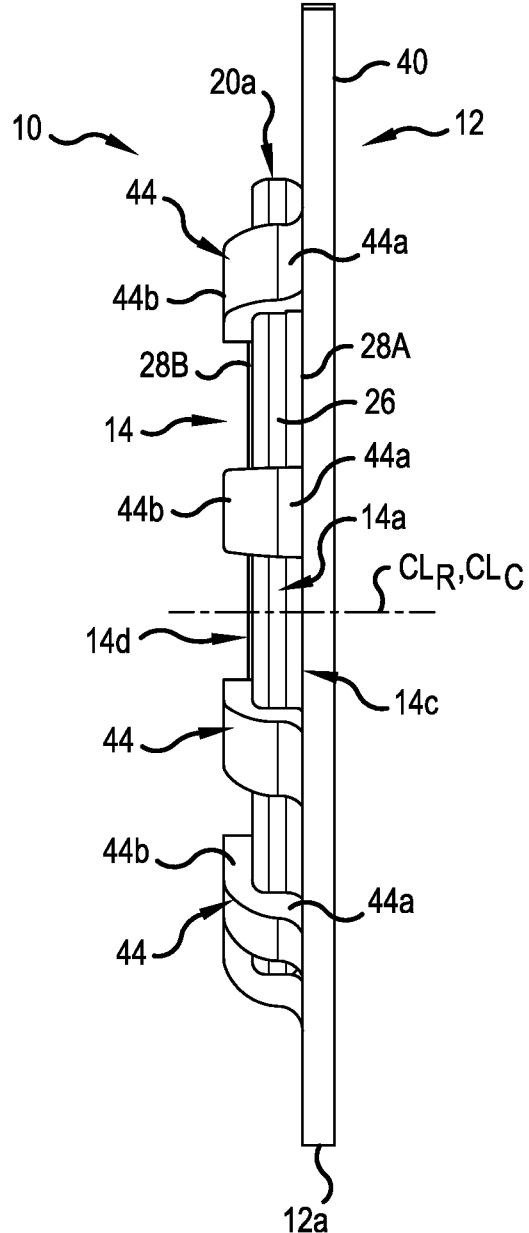
FIG. 6 is a side plan view of the conductive assembly.
Figure 7:
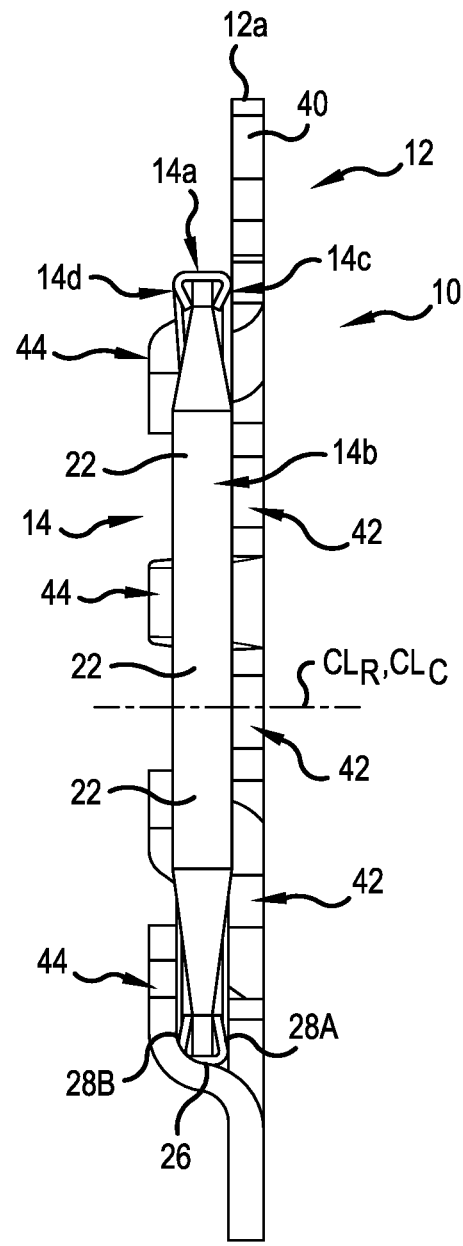
FIG. 7 is an axial cross-sectional view of the conductive assembly.

Further, an annular retention groove 8 is formed in an inner circumferential surface 6a of the outer member 6, as shown in FIG. 3, or an inner circumferential surface 4a of the bearing outer ring 4, as depicted in FIG. 2. In any case, the conductive assembly 10 basically comprises a mounting ring 12 disposeable within the retention groove 8 and an arcuate conductor 14 connected with the mounting ring 12 and engageable with the shaft 3 or the bearing inner ring 2 at a position spaced axially from the raceways $R_I$, $R_O$. As such, the conductive assembly 10 provides an electrically conductive path or paths between the shaft 3 and the outer member 6, which each extend through the conductor 14 and the mounting ring 12, so as to divert electric current from flowing through the raceways $R_I$, $R_O$ and thereby prevent damage to both the raceways $R_I$, $R_O$ and the rolling elements 7.

The mounting ring 12 is formed of an electrically conductive elastic material, such as for example low carbon steel, and is formed generally as a C-clip or "snap ring". The mounting ring 12 has a centerline $CL_R$, an outer circumferential surface 12a with an outside diameter $OD_R$ (FIG. 5) and two circumferential ends 13A, 13B spaced circumferentially apart such that an outer arcuate gap $G_O$ is defined between the two circumferential ends 13A, 13B. Further, the mounting ring 12 is deflectable generally radially inwardly such that each one of the two circumferential ends 13A, 13B displaces generally toward the other one of the two circumferential ends 13B, 13A to thereby reduce the outside diameter $OD_R$ of the ring 12.

Such inward deflection of the mounting ring 12 and accompanying relative displacement of the ring circumferential ends 13A, 13B enables installation of the mounting ring 12 into the retention groove 8. The mounting ring 12 is also deflectable radially outwardly after installation into the groove 8, such that the outer circumferential surface 12a is frictionally engageable with an inner circumferential surface 8a of the groove 8. The frictional engagement of the mounting ring 12 with the groove inner surface 8a retains the conductive assembly 10 coupled with the outer member 6 or the bearing outer ring 4.

Furthermore, the arcuate conductor 14 has a centerline $CL_C$, which is coaxial with the ring centerline $CL_R$, an outer radial end 14a, an inner radial end 14b, opposing first and second axial ends 14c, 14d and two circumferential ends 15A, 15B spaced circumferentially apart. The outer radial end 14a is attached to the mounting ring 12 and the inner radial end 14b engageable with the shaft 1 or the bearing inner ring 2. An inner arcuate gap $G_I$ is defined between the two circumferential ends 15A, 15B of the conductor 14 when the conductor 14 is installed about the shaft 3 or the inner ring 2. Further, the two circumferential ends 13A, 13B of the arcuate conductor 14 define a gap angle $\theta_C$ about the centerline $CL_C$, which preferably has a value of about ninety degrees (90°). The clearance space formed by the inner arcuate gap $G_I$, and preferably both gaps $G_I$, $G_O$, provides a substantial arcuate gap $G_I/G_I+G_O$ sized to provide a passage for fluid flow through the bearing 1 or/and clearance for a portion of the outer member 6 or a component (not shown) installed within or adjacent to the outer member 6.

Further, the arcuate conductor 14 is formed of a flexible material, preferably a combination of aluminum and carbon fibers as discussed below, so as to be radially deflectable. As such, each one of the two circumferential ends 15A, 15B of the arcuate conductor 14 displaces generally toward the other one of the two circumferential ends 15B, 15A of the conductor 14 when the mounting ring 12 deflects radially inwardly. After installation of the conductor assembly 10 within the groove 8, the arcuate conductor 14 deflects radially outwardly during outward deflection of the mounting ring 12. Having described the basic structure and function above, these and other components of the present conductive assembly 10 are described in further detail below.

Referring now to FIGS. 4-10, the conductor 10 preferably includes an outer, arcuate conductive retainer 20 and a plurality of conductive fibers 22 extending radially inwardly from the arcuate retainer 20 and configured to engage with the shaft 3 or inner ring 2, preferably with an interference (i.e., by bending of the fibers 22) of up to five millimeters (5 mm) diametrically. Specifically, the arcuate retainer 20 has a closed outer radial end 20a, an open inner radial end 20b, an annular channel 24 extending radially outwardly from the inner radial end 20b and two circumferential ends 21A, 21B providing the conductor circumferential ends 13A, 13B, respectively. Preferably, the arcuate retainer 20 includes an outer base wall 26 and a pair of sidewalls 28A, 28B extending radially inwardly from the base wall 26 and defining the circumferential channel 24. Also, the arcuate retainer 20 is preferably formed of a conductive metallic material, most preferably aluminum, but may be formed of another metallic material such as steel or copper, a conductive polymeric material, or any other electrically conductive material.

Further, the plurality of conductive fibers 22 are spaced circumferentially about the centerline $CL_C$ of the conductor 14 and are preferably evenly distributed along the entire arcuate perimeter (not indicated) between the circumferential ends 21A, 2B of the arcuate retainer 20. As best shown in FIG. 9, each conductive fiber 22 has an outer radial end 22a disposed within the channel 24 of the retainer 20 and at least one inner radial end 22b engageable with the shaft 3 or the bearing inner ring 2. Preferably, the arcuate conductor 14 further includes an arcuate conductive wire 30 (FIGS. 8 and 9) disposed within the retainer channel 24. Each conductive fiber 22 is bent about the arcuate wire 30 such that each fiber 22 has two inner radial ends 22b engageable with the shaft 3, or the bearing inner ring 2, and is generally U-shaped or V-shaped.

Figure 8:
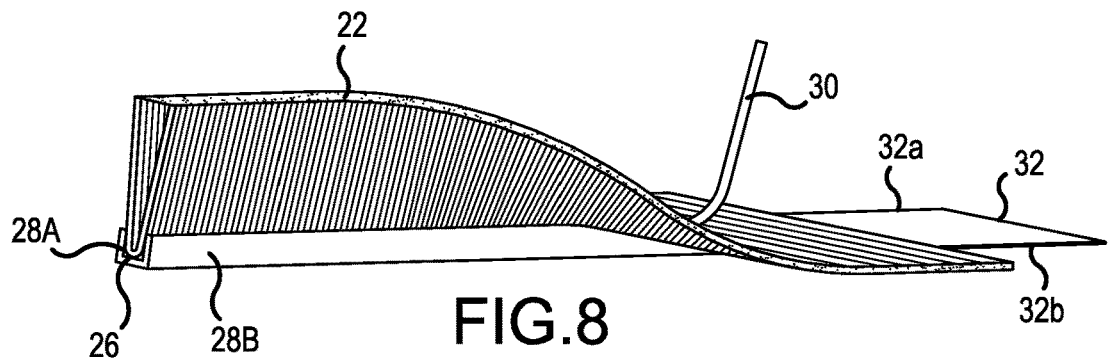
FIG. 8 is a perspective view depicting certain steps in the fabrication of a preferred conductor.
Figure 9:
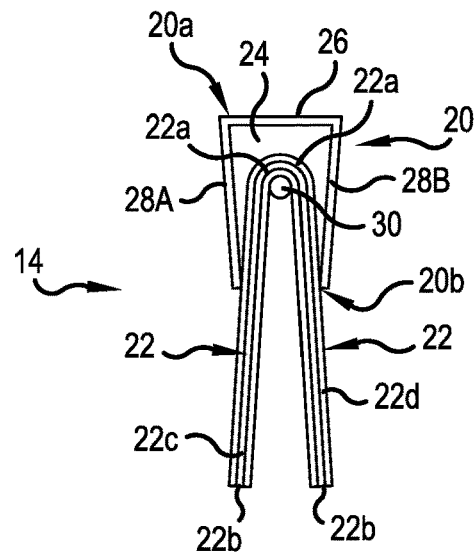
FIG. 9 is an axial cross-sectional view of the preferred conductor.
Figure 10:
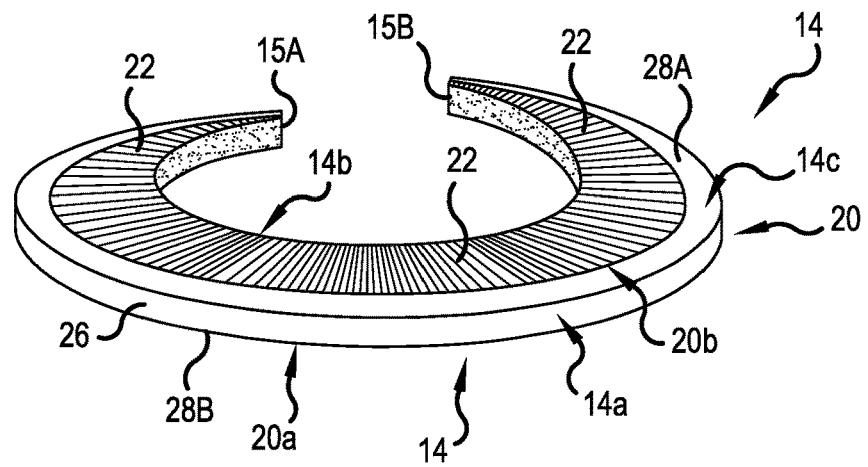
FIG. 10 is a perspective view of the preferred conductor.

Referring particularly to FIGS. 8-10, the arcuate conductor 14 is preferably formed by distributing the plurality of conductive fibers 22 along a rectangular conductive plate 32, such that each fiber 22 extends over both elongated edges 32a, 32b of the plate 32, as shown in FIG. 8. The wire 30 is then positioned to extend longitudinally across all of the conductive fibers 22 and then elongated edge portions of the plate 32 are bent upwardly to form the two sidewalls 28A, 28B, fold all of the fibers 22 around the wire 30 and form the channel 24. Preferably, the two sidewalls 28A, 28B of the arcuate retainer 20 are angled toward each other such that the plurality of conductive fibers 22 are "pinched" by the sidewalls 28A, 28B, as shown in FIG. 9. Thereby, the arcuate wire 30 and the outer ends 22a of the fibers 22 are retained within the annular channel 24, and a plurality of conductive paths extend from the plurality of fiber legs 22c, 22d and to the two sidewalls 28A, 28B and the base wall 26, and thereafter through the mounting ring 12.

Finally the elongated plate 32 is bent to form an arcuate shape having an inside diameter $ID_C$ (FIG. 5) sized to engage with the outer surface of the shaft 3. Preferably, each conductive fiber 22 is formed of carbon but may alternatively formed of a metallic material (e.g., copper, aluminum), a conductive polymeric material or any other appropriate material. Although the conductor 14 preferably includes the arcuate retainer 20 and the plurality of conductive fibers 22, the conductor 20 may be formed in any other appropriate manner. For example, the conductor 14 may be formed as an arcuate solid member (not shown) formed of a flexible, electrically conductive polymeric material, graphite or another electrically conductive material.

Referring now to FIGS. 4-7, the mounting ring 12 preferably includes an outer arcuate portion 40, a plurality of support tabs 42 and a plurality of retainer tabs 44 "staggered" between the support tabs 42. Specifically, the plurality of support tabs 42 extend radially inwardly from the outer arcuate portion 40 and are spaced circumferentially about the ring centerline $CL_R$ so as to be separated from each adjacent tab 42 by a separate slot 46. The first sidewall 28A of the preferred conductor arcuate retainer 20 is disposed against (and supported by) the plurality of support tabs 42. Further, the plurality of retainer tabs 44 are also spaced circumferentially about the ring centerline $CL_R$ such that each support tab 42 is disposed between two of the retainer tabs 44. Each retainer tab 44 has a radially outer portion 44a bent axially from the ring outer axial portion 40 adjacent to a separate one of the slots 46 and a radially inner portion 44b bent radially inwardly so as to be engaged with the second sidewall 28B of the conductor arcuate retainer 20. Thereby, the arcuate retainer 20, and thus the entire arcuate conductor 14, is connected with the mounting ring 12.

With the preferred structure of the mounting ring 12 and the conductor 14, conductive paths are provided through each of the plurality of conductive fibers 22, through the arcuate retainer 20, through the support tabs 42 and the retainer tabs 44, and finally through the outer arcuate portion 40 of the mounting ring 12 and into the outer member 6 or the bearing outer ring 4 (and thereafter to the outer member 6). Providing such conductive paths spaced axially from the bearing raceways $R_I$, $R_O$ prevents and current flow or sparking through the raceways $R_I$, $R_O$ and the resultant raceway damage caused thereby.

Further, the mounting ring 12 preferably has a first tool engagement hole 50A adjacent to the first circumferential end 13A and a second tool engagement hole 50B adjacent to the second circumferential end 13B. With these holes 50A, 50B, the mounting ring 12 is collapsible or deflectable radially inwardly when a tool (not shown) engages with both of the two tool engagement holes 50A, 50B so as to displace each circumferential end 13A, 13B toward the other one of the circumferential ends 13B, 13A. Preferably, the mounting ring 12 also includes two radially-inwardly extending fixing tabs 52A, 52B each located adjacent to a separate one of the mounting ring circumferential ends 13A, 13B, respectively. Each fixing tab 52A, 52B is engageable with a separate one of the circumferential ends 21A, 21B, respectively, of the conductor arcuate retainer 20 to prevent angular displacement of the conductor 14 about the central axis $A_C$.

Although the mounting ring 12 is preferably formed as described above, the mounting ring 12 may be formed in any other appropriate manner that enables the ring 12 to be disposeable within the retention groove 8 and to support the conductor 14. For example, the mounting ring 12 may include a substantially flat arcuate plate and either a single bracket or a plurality of spaced apart brackets movably attached to the plate and engageable with the conductor arcuate retainer 20 to secure the retainer to the flat plate. The scope of the present invention encompasses all appropriate constructions of the mounting ring 12 capable of functioning generally as described herein.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. An electrically conductive assembly for preventing current flow through the raceways of a bearing having an inner ring disposed about a shaft and an outer ring disposed within a bore of an outer member, the shaft or the outer member being rotatable about a central axis through the shaft, an annular retention groove being formed in an inner circumferential surface of the outer member or of the bearing outer ring and having first and second facing radial surfaces, the conductive assembly comprising:

a mounting ring including a flat, outer arcuate plate portion with a first axial end and a second axial end, the outer arcuate plate portion being disposable within the retention groove to couple the mounting ring with the outer member or bearing outer ring such that the first axial end is disposed against the first radial surface of the groove and the second axial end is disposed against the second radial surface of the groove, the mounting ring being formed of an electrically conductive elastic material, the mounting ring having an outside diameter and two circumferential ends spaced circumferentially apart and being deflectable radially inwardly such that each one of the two circumferential ends displaces toward the other one of the two circumferential ends to reduce the outside diameter of the ring for installation into the retention groove; and an arcuate conductor having a centerline, an outer radial end attached to the first axial end of the mounting ring plate portion, an inner radial end engageable with the shaft or the bearing inner ring such that an electrically conductive path extends between the shaft and the outer member through the arcuate conductor and the mounting ring.

2. The electrically conductive assembly as recited in claim 1 wherein the mounting ring is deflectable radially outwardly after installation into the groove and has an outer circumferential surface frictionally engageable with an inner circumferential surface of the groove so as to retain the conductive assembly within the outer member or the bearing outer ring.

3. The conductive assembly as recited in claim 1 wherein the mounting ring has a first tool engagement hole adjacent to the first circumferential end and a second tool engagement hole adjacent to the second circumferential end, the mounting ring being collapsible inwardly when a tool engages the two tool engagement holes so as to displace each circumferential end toward the other one of the circumferential ends.

4. The electrically conductive assembly as recited in claim 1 wherein the mounting ring has a centerline and includes a plurality of support tabs extending radially inwardly from the outer arcuate plate portion and spaced circumferentially about the centerline, the first axial end of the conductor arcuate retainer being disposed against the plurality of support tabs, and a plurality of retainer tabs spaced circumferentially about the centerline such that each retainer tab is disposed between two of the support tabs, each retainer tab being bent axially and radially inwardly from the outer axial portion so as to be engaged with the second axial end of the conductor arcuate retainer.

5. The electrically conductive assembly as recited in claim 1 wherein the arcuate conductor has two circumferential ends spaced circumferentially apart such that an arcuate gap is defined between the two circumferential ends of the conductor when the conductor is installed about the shaft or the inner ring.

6. The electrically conductive assembly as recited in claim 5 wherein the arcuate conductor is deflectable such that each one of the two circumferential ends of the arcuate conductor displaces toward the other one of the two circumferential ends of the conductor when the mounting ring deflects radially inwardly.

7. The conductive assembly as recited in claim 5 wherein the two circumferential ends of the arcuate conductor define a gap angle about the centerline, the gap angle having a value of at least thirty degrees.

8. The conductive assembly as recited in claim 5 wherein the arcuate gap is sized to provide a passage for fluid flow through the bearing or clearance for a portion of the outer member or a component installed within the outer member.

9. The conductive assembly as recited in claim 1 wherein the conductor includes:
an arcuate conductive retainer having an outer radial end, an inner radial end and an annular channel extending radially outwardly from the inner radial end; and
a plurality of conductive fibers spaced circumferentially about the centerline, each fiber having an outer radial end disposed within the channel of the retainer and at least one inner radial end engageable with the shaft or the bearing inner ring.

10. The conductive assembly as recited in claim 9 wherein the conductor further includes an arcuate wire disposed within the channel of the arcuate retainer and each conductive fiber is bent about the arcuate wire such that each fiber has two inner radial ends engageable with the shaft.

11. The conductive assembly as recited in claim 9 wherein:
the arcuate retainer includes an outer base wall having opposing first and second axial ends, a first sidewall extending radially inwardly from the first axial end of the base wall and a second sidewall extending radially inwardly from the second axial end of the base wall, the annular channel being formed between the first and second sidewalls; and the mounting ring has a centerline and includes an outer arcuate portion, a plurality of support tabs extending radially inwardly from the outer arcuate portion and spaced circumferentially about the centerline, the first sidewall of the conductor arcuate retainer being disposed against the plurality of support tabs, and a plurality of retainer tabs spaced circumferentially about the centerline such that each retainer tab is disposed between two of the support tabs, each retainer tab being bent axially and radially inwardly from the outer axial portion so as to be engaged with the second sidewall of the conductor arcuate retainer.

12. The conductive assembly as recited in claim 11 wherein the mounting ring includes two radially-inwardly extending fixing tabs each located adjacent to a separate one of the mounting ring circumferential ends, each fixing tab being engageable with a separate one of the circumferential ends of the conductor arcuate retainer to prevent angular displacement of the conductor about the central axis.

13. An electrically conductive assembly for preventing current flow through the raceways of a bearing having an inner ring disposed about a shaft and an outer ring disposed within a bore of an outer member, the shaft or the outer member being rotatable about a central axis through the shaft, an annular retention groove being formed in an inner circumferential surface of the outer member or of the bearing outer ring, the conductive assembly comprising:
a mounting ring including a flat, arcuate plate portion disposable within the retention groove and formed of an electrically conductive elastic material, the mounting ring having an outside diameter and the arcuate plate portion having two circumferential ends spaced circumferentially apart and being deflectable radially inwardly such that each one of the two circumferential ends displaces toward the other one of the two circumferential ends to reduce the outside diameter of the ring for installation into the retention groove, an arcuate gap being defined between the two circumferential ends of the arcuate plate portion when the mounting ring is installed within the groove, the arcuate gap defining an angle about the centerline and the angle having a value of at least thirty degrees; and
an arcuate conductor having a centerline and including an arcuate conductive retainer, the retainer having an outer radial end, an inner radial end, an annular channel extending radially outwardly from the inner radial end, and a plurality of conductive fibers spaced circumferentially about the centerline, each fiber having an outer radial end disposed within the channel of the retainer and at least one inner radial end engageable with the shaft or the bearing inner ring such that an electrically conductive path extends between the shaft and the outer member through the arcuate conductor and the mounting ring.

14. The electrically conductive assembly as recited in claim 13 wherein the mounting ring is deflectable radially outwardly after installation into the groove and has an outer circumferential surface frictionally engageable with an inner circumferential surface of the groove so as to retain the conductive assembly within the outer member or the bearing outer ring.

15. The electrically conductive assembly as recited in claim 13 wherein the arcuate conductor has first and second axial ends and the mounting ring has a centerline and includes an outer arcuate portion, a plurality of support tabs extending radially inwardly from the outer arcuate portion and spaced circumferentially about the centerline, the first axial end of the conductor arcuate retainer being disposed against the plurality of support tabs, and a plurality of retainer tabs spaced circumferentially about the centerline such that each retainer tab is disposed between two of the support tabs, each retainer tab being bent axially and radially inwardly from the outer axial portion so as to be engaged with the second axial end of the conductor arcuate retainer.

16. The conductive assembly as recited in claim 13 wherein the arcuate retainer has two circumferential ends spaced circumferentially apart such that an arcuate gap is defined between the two circumferential ends of the conductor when the conductor is installed about the shaft or the inner ring.

17. The conductive assembly as recited in claim 16 wherein the arcuate gap is sized to provide a passage for fluid flow through the bearing or clearance for a portion of the outer member or a component installed within the outer member.

18. The electrically conductive assembly as recited in claim 13 wherein:
the arcuate conductor is deflectable such that each one of the two circumferential ends of the arcuate conductor displaces toward the other one of the two circumferential ends of the conductor when the mounting ring deflects radially inwardly; and
both the mounting ring and the arcuate conductor are each deflectable radially outwardly after installation into the groove, the mounting ring having an outer circumferential surface frictionally engageable with an inner circumferential surface of the groove so as to retain the conductive assembly within the outer member or the bearing outer ring.

19. The conductive assembly as recited in claim 13 wherein the conductor further includes an arcuate wire disposed within the channel of the arcuate retainer and each conductive fiber is bent about the arcuate wire such that each fiber has two inner radial ends engageable with the shaft.

20. An electrically conductive assembly for preventing current flow through the raceways of a bearing having an inner ring disposed about a shaft and an outer ring disposed within a bore of an outer member, the shaft or the outer member being rotatable about a central axis through the shaft, an annular retention groove being formed in an inner circumferential surface of the outer member or of the bearing outer ring, the conductive assembly comprising:
a mounting ring disposeable within the retention groove and formed of an electrically conductive elastic material, the mounting ring having an outside diameter and two circumferential ends spaced circumferentially apart and being deflectable radially inwardly such that each one of the two circumferential ends displaces toward the other one of the two circumferential ends to reduce the outside diameter of the ring for installation into the retention groove; and
an arcuate conductor having a centerline, an outer radial end attached to the mounting ring, an inner radial end engageable with the shaft or the bearing inner ring such that an electrically conductive path extends between the shaft and the outer member through the arcuate conductor and the mounting ring;
wherein the arcuate conductor has first and second axial ends and the mounting ring has a centerline and includes an outer arcuate portion, a plurality of support tabs extending radially inwardly from the outer arcuate portion and spaced circumferentially about the centerline, the first axial end of the conductor arcuate retainer being disposed against the plurality of support tabs, and a plurality of retainer tabs spaced circumferentially about the centerline such that each retainer tab is disposed between two of the support tabs, each retainer tab being bent axially and radially inwardly from the outer axial portion so as to be engaged with the second axial end of the conductor arcuate retainer.

\* \* \* \* \*